United States Patent
Richter

[15] 3,687,048
[45] Aug. 29, 1972

[54] APPARATUS FOR STEREOSCOPIC PHOTOGRAPHY
[72] Inventor: Ernst Richter, West Islip, N.Y.
[73] Assignee: Stereo-Optics, Inc., San Francisco, Calif.
[22] Filed: Aug. 6, 1970
[21] Appl. No.: 61,717

[52] U.S. Cl. .................................... 95/86, 95/18 P
[51] Int. Cl. ........................................... G03b 17/56
[58] Field of Search ............................. 95/18 P, 86

[56] References Cited

UNITED STATES PATENTS 2,448,084    8/1948    Davis ........................... 95/86
2,492,520    12/1949   Bonnet ................... 95/18 P X

FOREIGN PATENTS OR APPLICATIONS 156,106    8/1938    Germany ................... 95/18 P Primary Examiner—Samuel S. Matthews
Assistant Examiner—E. M. Bero
Attorney—Kane, Dalsimer, Kane, Sullivan & Kurucz

[57] ABSTRACT

Apparatus having a camera and an object to be photographed in three dimension aligned with the center axis of a rotatable bar with means to focus the object in a straight-on position by moving it along such axis. The rotatable bar is mounted on a pivot carriage which can be moved along the bar until a pivot on such carriage is vertically aligned with a point with respect to the object, thereby determining the pivot of rotation of the bar and automatically fixing the same right and left angle from the position of initial alignment when the bar is rotated. An exposure is then taken from each side to obtain a stereoscopic picture of the object.

6 Claims, 14 Drawing Figures

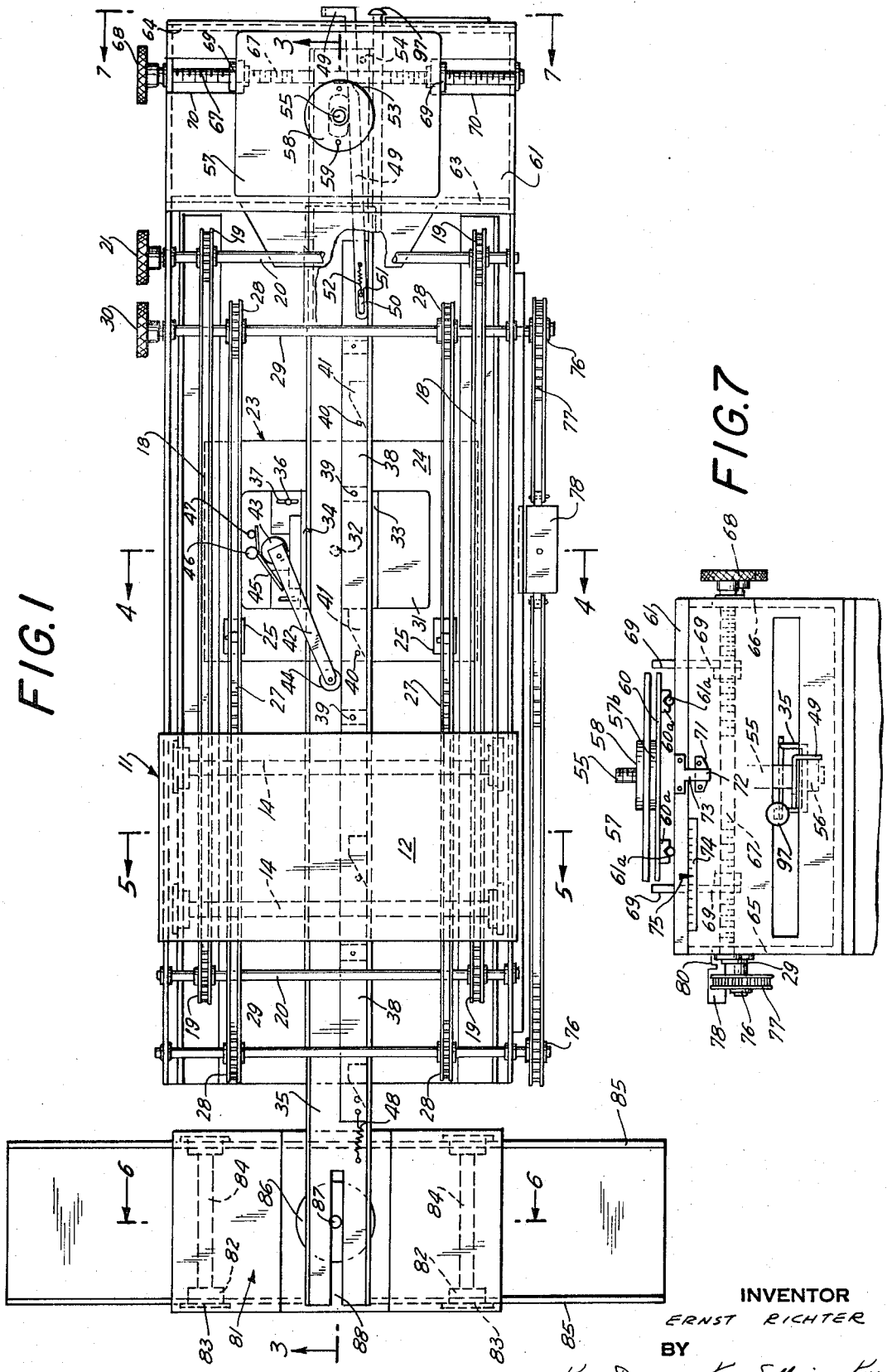

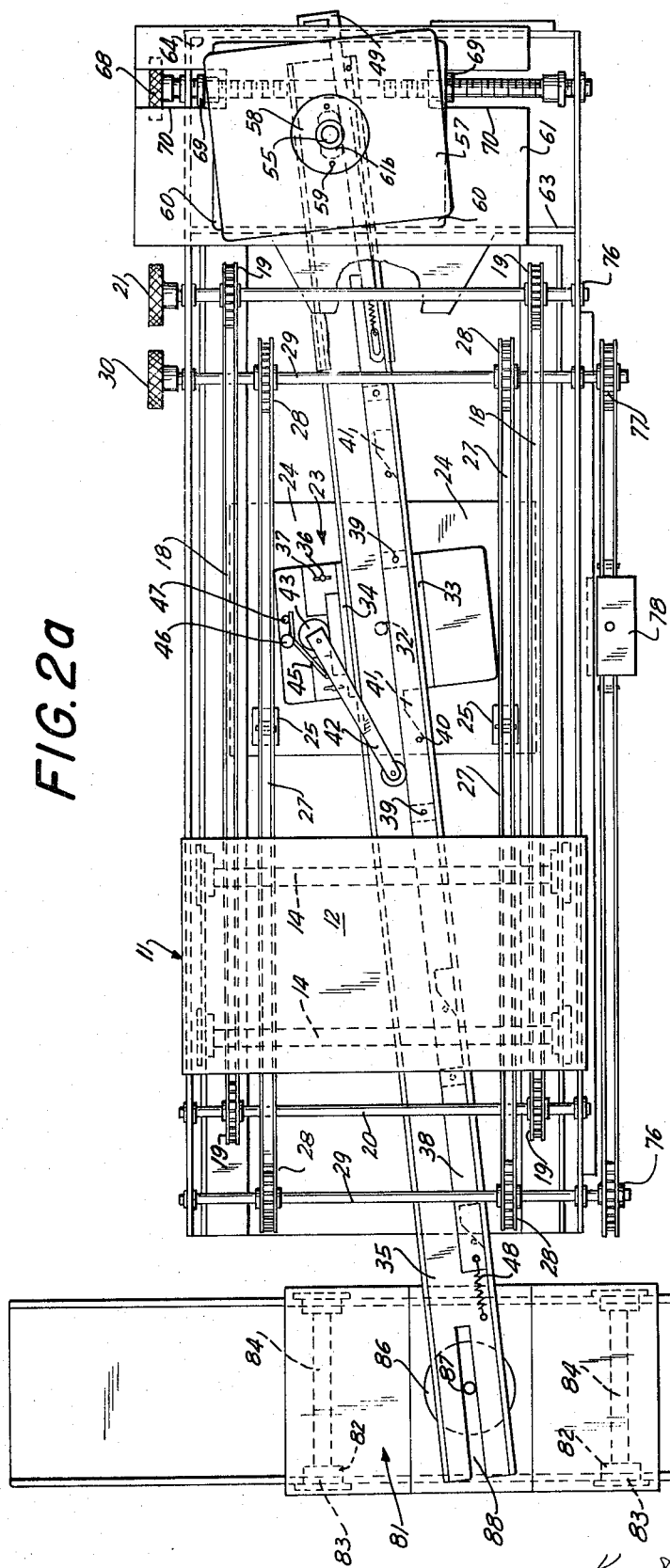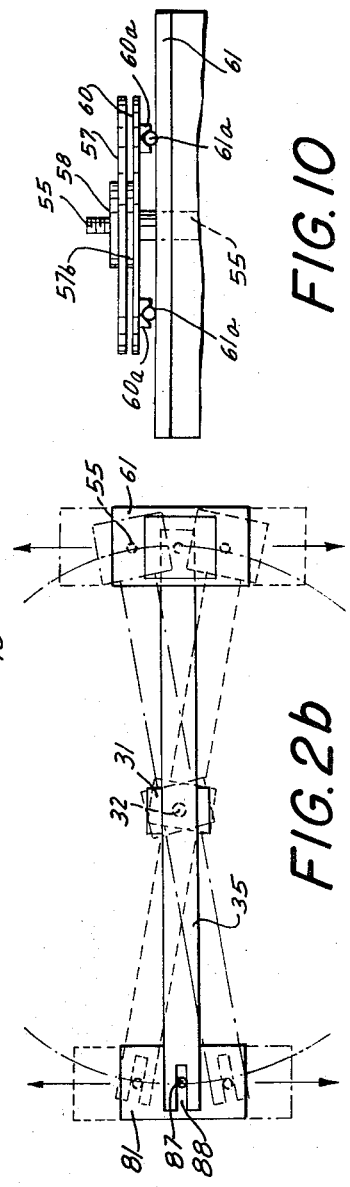

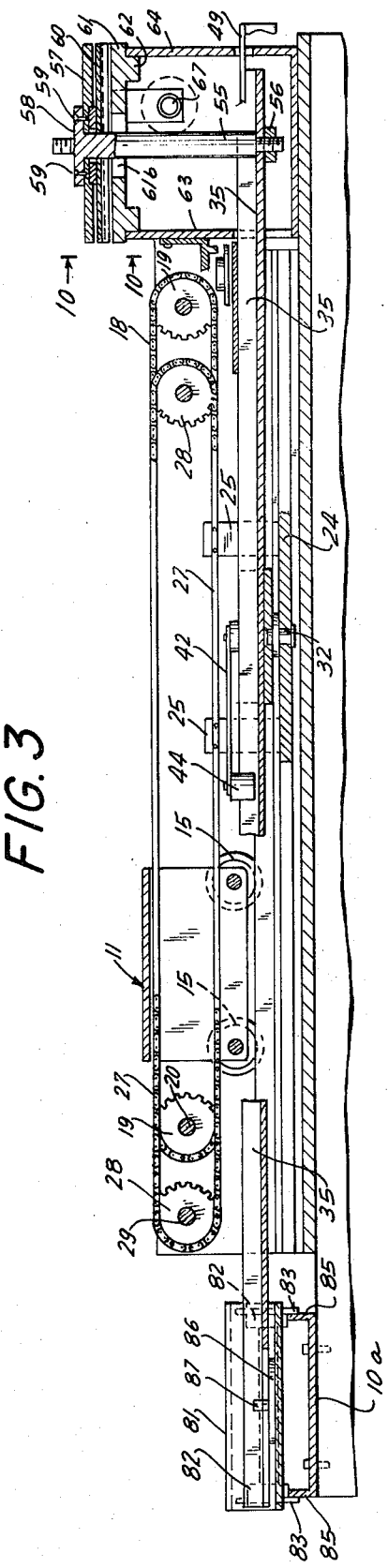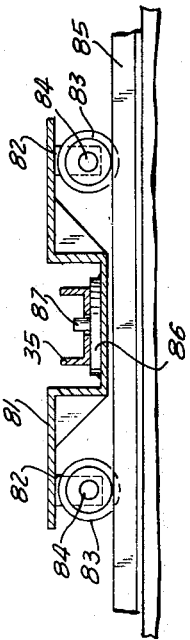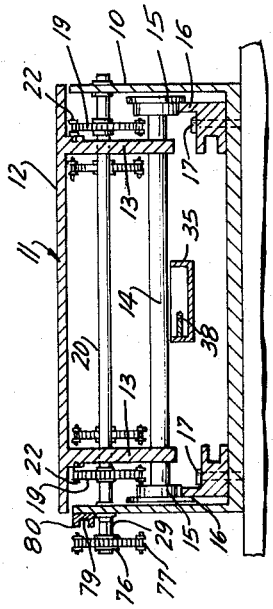

INVENTOR
ERNST RICHTER
BY
ATTORNEYS

APPARATUS FOR STEREOSCOPIC PHOTOGRAPHY

BACKGROUND OF THE INVENTION

1. Field of Invention

The present invention relates generally to photography and more particularly to apparatus using a single lens camera to take two exposures at different angles and produce a stereoscopic picture.

2. Description of the Prior Art

Stereoscopic photography using single or double lens cameras is well known. The apparatus of the present invention employs a single lens camera which is rotated along the arc of a circle to take exposures at different angles. The following prior art U.S. patents are known to the applicant:

| | |
|---|---|
| Kanolt | No. 2,158,660 |
| Worcester | No. 2,314,642 |
| Donaldson | No. 2,400,455 |
| Davis | No. 2,448,084 |
| Markle | No. 2,599,269 |
| Ianuzzi | No. 2,782,700 |
| Geraci | No. 2,893,303 |
| Leach | No. 3,037,441 |
| Stockbridge | No. 3,380,360 |
| Bartholomew | No. 3,392,648 |

A significant improvement of the present invention over such art, which enhances the taking of a stereoscopic picture, is a pivotally mounted bar supported on a pivot carriage which is movable along such bar to bring the pivot into vertical alignment with respect to the object being photographed. The structural arrangement and cooperation of the bar with the carriage and the manner of locking such bar to the carriage are features, among others, which are advances in the field defined by the aforementioned prior art.

SUMMARY OF THE INVENTION

It is an object of the invention to provide an apparatus for a single lens camera which can be focused on an object to be photographed and then easily and quickly set to take exposures from each side to provide a picture having a three-dimensional effect.

It is a further object to provide an apparatus having a camera mounted on one end of a rotatable bar slidably secured to a pivot carriage which can be moved to vertically align the pivot with a point behind the back of the object to be photographed previously focused with the camera in a straight-on position, such positioning of the pivot determining the right and left angles of the bar for taking the exposures of the object.

It is a further object to provide an apparatus having a camera mounted on one end of a rotatable bar wherein the arc of rotation of the bar can be varied and preset for taking exposures at different angles.

The objects and advantages of the invention will become more readily apparent from the following detailed description taken in conjunction with the accompanying drawings.

BRIEF DESCRIPTION OF THE DRAWINGS

FIG. 1 is a top plan view of the apparatus embodying the present invention with the axis bar positioned to take a picture straight-on;

FIG. 2a is a view similar to that of FIG. 1 with the axis bar positioned to take a picture at an angle from the right side;

FIG. 2b is a schematic top plan showing the axis bar in various positions;

FIG. 3 is a cross sectional view taken along lines 3—3 of FIG. 1;

FIG. 5 is a cross sectional view taken along lines 5—5 of FIG. 1;

FIG. 6 is a cross sectional view taken along lines 6—6 of FIG. 1;

FIG. 7 is a cross sectional view taken along lines 7—7 of FIG. 1;

FIG. 10 is a cross sectional view taken along lines 10—10 of FIG. 3;

DESCRIPTION OF THE PREFERRED EMBODIMENT

Figure 4:
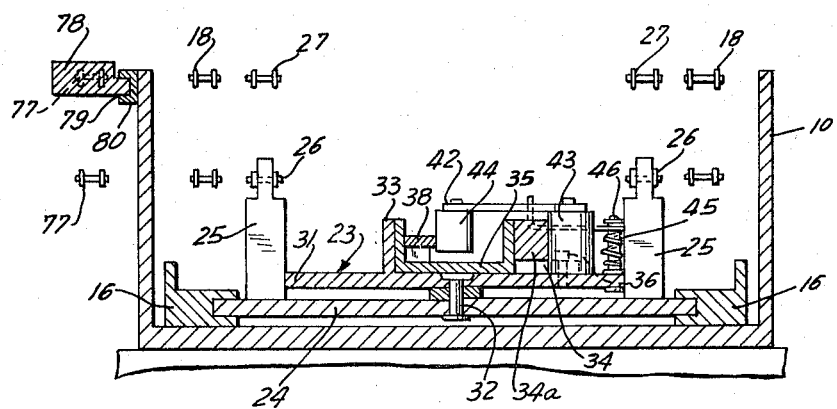
FIG. 4 is a cross sectional view taken along lines 4—4 of FIG. 1.

Referring to the drawings, FIG. 1 shows a frame member 10 running the length of the apparatus and supporting the various components. An object table 11, on which can be placed an object to be photographed, is movable along the center of the frame to or away from the camera. This table consists of a flat platform 12 supported by vertical members 13 through which pass a pair of axles 14 with wheels 15 at each end of the axle (FIG. 5). These wheels ride on rails 16 secured along each side of the frame member by bolts 17. A pair of belts or chains 18 ride over sprocket wheels or pulleys 19 mounted on shafts 20 running through each end of the frame member. A knob 21 is secured to one end of one of the shafts 20 to permit rotation of both shafts and movement of the chains 18 simultaneously. The chains 18 are held by pins 22 to the vertical members 13 of the object table so that rotation of the knob 21 moves the table along the rails in either direction.

Also movable along the center of the frame member 10 is a pivot carriage 23 (FIGS. 1 and 4). This carriage consists of a base plate 24 which slides within slots in each side of the rails 16. Mounted on the base plate are vertical supports 25 which are secured by pins 26 to a pair of belts or chains 27. These chains ride over sprocket wheels 28 mounted on shafts 29 running through each end of the frame member. A knob 30 is secured to one end of one of the shafts 29 to permit rotation of both shafts and movement of the chains 27 simultaneously. Rotation of the knob 30 moves the pivot carriage 23 along the rails in either direction. A pivot plate 31 is affixed to the base plate 24 by a pivot rod 32, thus permitting the plate 31 to rotate on the base plate 24.

Figure 8:
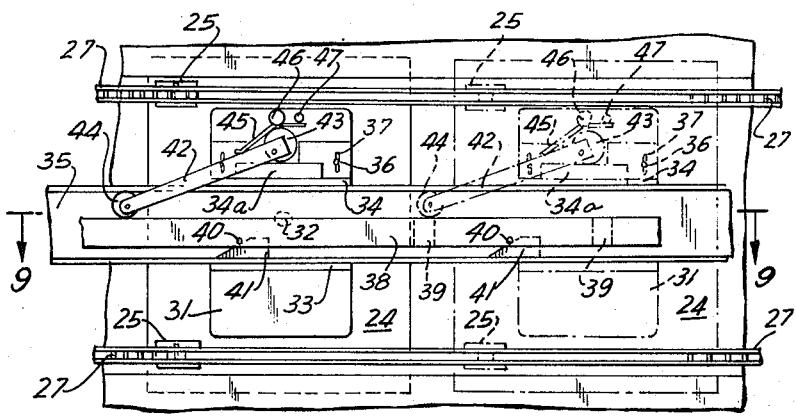
FIG. 8 is a top plan view of the mechanism for locking the axis bar to the turntable with the table shown in two positions along the bar.

A channel is formed on the plate 31 by a fixed vertical member 33 and a slidable member 34 (FIG. 4). A U-shaped axis bar 35 is positioned on the plate 31 between the members 33 and 34 so that the pivot carriage 23 is free to slide along the bar 35. FIG. 8 illustrates the plate 31 in two positions along the bar 35. The bar 35 runs for the full length of the machine as shown in FIG. 1. The slidable member 34 is secured to the plate 31 by screws 36 riding in slots 37 in the member 34 whereby the member 34 can be pressed against the bar 35 to lock the bar to the plate 31 in any desired position.

Figure 9:
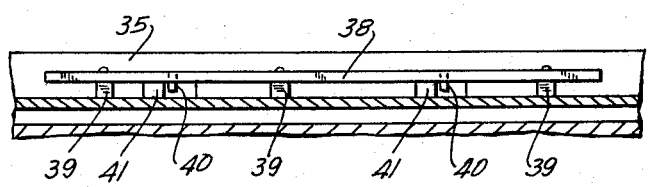
FIG. 9 is a cross sectional view taken along lines 9—9 of FIG. 8.

The mechanism for locking the bar 35 to the plate 31 is illustrated in FIGS. 1, 4, and 9. A slidable bar 38 is positioned within the channel of the bar 35 and runs for almost the full length of the bar 35. Such bar 38 has a series of spaced strips 39, which elevate the bar above the base of the channel of bar 35, and a series of spaced pins 40. Mounted on the base along one side of the said channel are a series of triangular members 41 which cooperate with the pins 40. A lever 42 is secured at one end to a rotatable offset cam 43. At the opposite end of the lever 42 is a hub 44 which presses against the bar 38. The lever is spring loaded by a spring wire 45 wrapped around post 46 with one end of the spring held against a post 47 and the other end of the spring pressed against the lever 42. Normally such spring loaded lever serves to press the bar 38 against one side of the channel of the axis bar 35. One end of the bar 38 has a spring 48 (FIG. 1) which normally holds such bar with the pins 40 adjacent the apexes of the triangles of the members 41. The other end of the bar 38 has a handle lever 49 secured thereto through a slot 50, pin 51 and spring 52. As the handle lever 49 is pulled, the spring 52 is first extended and then the bar 38 is moved along the channel of the axis bar 35. Such movement of the bar 38 presses the pins 40 along the sides of the triangles of members 41 and thus slides the bar 38 toward the center of the channel of axis bar 35, as shown in FIG. 8. The bar 38 thus moves the lever 42 and rotates the cam 43. The offset portion of the cam exerts pressure against the block 34a of the slidable member 34 and thus locks the axis bar 35 between the members 33 and 34. This lock keeps the bar in the desired position with respect to the pivot carriage 23, as will be further explained hereinafter. To void the necessity of the operator holding the handle lever 49 a notch 53 in the lever 49 and a pin 54 on the axis bar 35 provide a convenient lock to hold the bar 38 in locked position. To release the bar and permit movement of the axis bar 35 with respect to the pivot carriage it is only necessary to slide the handle lever 49 sideways to disengage the notch 53 from the pin 54.

At one end of the axis bar 35 a vertical post 55 is affixed to such bar by a nut 56 threaded to the post (FIG. 3). At the upper end of the post 55 is a camera table 57 secured to the post by a disc 58 held to the table by screws 59. The bottom of the camera table 57 has a circular groove 57b mounted on a plate 60, thus providing a turn bearing surface so that the camera table can rotate the plate 60 as the axis bar is moved to different angles. Mounted on the bottom of the plate 60 are a pair of parallel rods 60a with triangular grooves 60b (FIG. 10). These grooves ride on top of a pair of rods 61a which are affixed to the top of a camera carriage 61. The carriage 61 has a pair of horizontal bar members 62 which ride between a pair of support plates 63 and 64 projecting upwardly as parts of the frame member 10 (FIG. 3). The carriage 61 has a slot 61b running parallel to the rods 61a. The post 55 passes through the slot 61b and center holes in the plate 60, the camera table 57 and the disc 58. The top of the post 55 is threaded for receiving a camera. The mounting arrangement for the camera table 57, plate 60 and carriage 61 permits the simultaneous movement of the carriage 61 from side to side in a straight line along the frame members 63 and 64, the plate 60 backward and forward in a straight line along the rods 61a while moving sideways on the carriage 61, and the camera table in a circular direction around the post 55 while moving backward or forward and sideways. The arrangement insures that, upon rotation of the axis bar on its pivot to different angles, the camera will rotate along an arc and always be at the same distance from the pivot at any point on the arc the said distance being referred to herein as the inclination distance. Thus a lens focused will stay in focus at any point of the radius. It will be understood that the camera carriage and table can be operated by hand or by a motor connected with the carriage.

Mounted between support plates 65 and 66 of the frame member 10 is a rod 67 having right and left threads and a knob 68 for rotating the rod in either direction (FIGS. 1 and 7). Threaded into each side of the rod 67 is a stop 69 which projects upwardly in a slot 70 in the camera carriage 61 and determines the limit of movement of the camera table 57. These stops are so positioned on the rod 67 that a setting of the knob establishes the same limit of movement on the right side as on the left side. Affixed to the plate 64 is a center stop 71 with a notch 72 located in the center of the stop (FIG. 7). Cooperating with such notch 72 is a triangular spring finger 73 affixed to the camera carriage 61. This notch and finger serve to center the axis bar and camera table for the initial focusing straight-on of the camera on the object. The finger can be released from the notch merely by pressure on the finger. At one side of the plate 64, along the line of movement of one of the stops 69, is a scale 74 secured to the plate (FIG. 7). A pointer 75 secured to the camera carriage 61 is superimposed over the scale 74 so that the position of the said carriage and stop can be read on the scale for future settings.

Affixed to the ends of the shafts 29 along one outer side of the frame 10 are sprocket wheels 76 over which ride a chain 77, which is secured to an indicator carriage 78 (FIG. 1). This carriage rides in a slot 79 of a track 80 mounted on the side of the frame (FIG. 7).

At the other end of the axis bar 35 from the camera table there is a projection or background table 81 (FIGS. 1 and 6). This table has wheel mounts 82 projecting downward from the table, which mounts carry wheels 83 on axles 84. These wheels ride on tracks 85 affixed to a frame member 10a running at right angles to the frame member 10. Secured at the center of the table 81 is a pivot mount 86 and pivot 87. A slot 88 in the axis bar 35 fits over the pivot 87, so that the bar 35 is free to slide along the pivot 87 but will move the table 81 crosswise as the bar rotates in either direction. The center of the table 81, the pivot rod 32 on which the axis bar 35 rotates and the center of the camera table 57 will all remain in fixed alignment as the axis bar 35 rotates in either direction (FIG. 2b). This table 81 is not required for the primary function of the present invention but will serve to hold either a projector to project a background image for the object being photographed or merely a background in back of the object being photographed, as will be explained more fully hereinafter.

Figure 11:
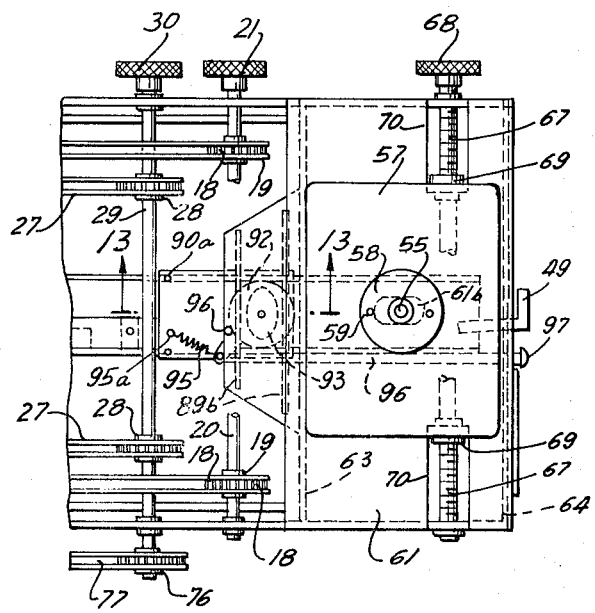
FIG. 11 is a top plan view showing the camera end of the apparatus.
Figure 12:
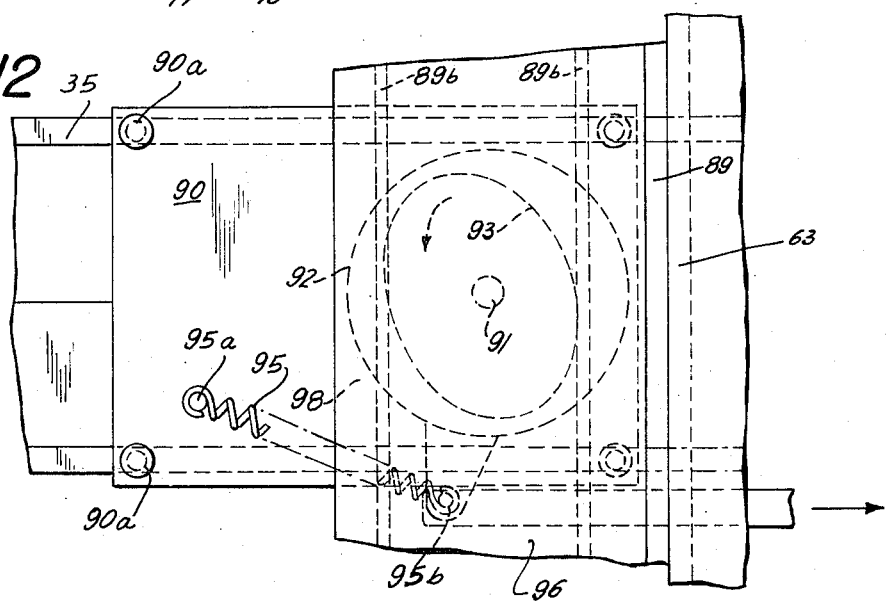
FIG. 12 is an enlarged view of a portion of FIG. 11 showing the mechanism for aligning the axis bar with respect to the camera mount.
Figure 13:
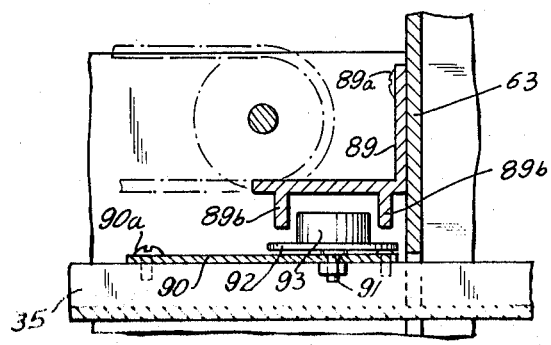
FIG. 13 is a cross sectional view taken along lines 13—13 of FIG. 11.

In view of the interconnection between the camera table 57 and the axis bar 35 there may be shifting of the camera table forward or backward when moving the pivot carriage 23. To take care of such possible shifting, an alignment device shown in FIGS. 11, 12 and 13 is provided. Such device has an L-shaped plate 89 affixed to the center of the frame member 63 by screws 89a with two parallel spaced strips 89b projecting downwardly from the plate (FIG. 13). There is a flat plate 90 affixed to the axis bar 35 by screws 90a. Mounted on the top of the plate 90 by a pivot 91 is a circular turntable 92, to which is affixed an elliptical cam 93. Such cam projects upwardly sufficiently to extend between the strips 89b and has a narrow dimension small enough to pass freely between the spaced strips 89b. The turntable 92 is provided with a projecting arm 94 to which is affixed a spring 95 held at each end by pins 95a and 95b. Also secured to the arm is a pull lever 96 with a knob 97 for sliding the lever. The spring 95 and a stop pin 98 in the path of rotation of the arm 94 normally holds the table 92 in a position so that the narrow portion of the cam 93 will freely pass between the strips 89b. When the axis bar 35 is centered and the knob 97 is pulled, the table 92 and cam 93 will rotate, thus forcing the wide portion of the cam against the strips 89b and in turn moving the pivot point and camera mount to the straight-on position.

OPERATION OF THE APPARATUS

The camera is mounted in the center of the camera table 57 by affixing either to the threaded top of the post 55 or to a suitable mounting secured to such post. The axis bar 35 is affixed in the center position by means of the notch 72 and finger 73. At this stage the handle 49 is released so that the axis bar is slidable between the members 33 and 34 of the pivot carriage 23. The knob 97 is now pulled which rotates the cam 93 and forces it against the strips 89b. This action brings the axis bar and the camera mount to the straight-on position and assures that the cam 93 is free to move between the strips 89b when the knob 97 has been released. The object to be photographed is placed in the center of the object table 11 and the knob 21 is rotated in either direction to bring the object on the table in the proper and desired focus in the straight-on position. The indicator carriage must then be aligned to provide the proper depth for the object to be photographed by rotating the knob 30. The indicator can be any conventional means, such as a light mounted on the indicator carriage with a beam or pin point of light emanating therefrom which can be visually focused on any point on the object or behind the object. In any case such alignment moves the inclination point until it is aligned vertically beneath the point on or behind the object. The inclination point is determined by experience or calculation to give the maximum or desired stereoscopic effect or depth. Since the chain moving the indicator carriage is linked with the chains moving the pivot carriage 23, rotation of the knob 30 will likewise move the pivot carriage 23 so that the determined inclination point will be superimposed directly over the pivot rod 32 in the center of the pivot carriage 23. The system is now properly aligned and the angles of rotation of the axis bar 35 and the camera table on which the camera is mounted in both the right and left directions are automatically determined to give the proper angle for each of the two exposures for the stereoscopic picture of the object. It will be understood that it is necessary in taking a stereoscopic picture that the angle for one picture from one side must be the same as the angle for the picture from the other side. With the object thus vertically aligned with the pivot rod it is now only necessary to pull the handle lever 49 and lock the axis bar 35 on the pivot carriage 23. Such bar is now rotatable on the pivot rod 32.

Referring to FIGS. 2a and 2b, the finger 73 is released from the notch 72 and the axis bar 35 is rotated to one side and the focus of the object is checked to determine the sufficiency of the angle at which the exposure will be taken. At this stage the knob 68 should be rotated so that the stops 69 are opened to their full width (FIG. 7). The purpose of such focusing is to insure that the angle at which the axis bar is set gives an exposure which will fully encompass the front and side of the object to give the best exposure. When such angle has been determined, the knob 68 is rotated so that the camera table on that side rests against the stop on the same side. This automatically sets the limit on each side for rotation of the axis bar. An exposure of the object is then taken at that side. The axis bar is then rotated to the other side and the second exposure of the object is taken from that side. Thus, there are now two exposures of the object taken at corresponding angles with respect to the center line of the apparatus. FIG. 2b illustrates the center line of the apparatus and the right and left angles from which the exposures are taken.

If a background is desired for the object, it can be placed in the center of table 81 or a projector can be placed on the table to project a background image on the object. This is not a required feature of the invention if it is merely desired to take a stereoscopic picture of the object.

Although a preferred embodiment of the invention has been disclosed and described in detail herein, it should be understood that the invention is in no sense limited thereby and its scope is to be determined by that of the appended claims.

Having thus described the invention, what is claimed is:

1. Apparatus for taking stereoscopic pictures comprising
   a frame,
   a carriage slidably mounted along a line on said frame,
   a bar pivotally mounted about a point on said carriage to enable pivoting thereof to positions on either side of said line,
   a camera mounted on one end of said bar,
   a support for the object to be photographed movable along said line to bring the object into focus with the camera
   said carriage being movable to vertically align the pivot point with a point predetermined with respect to the object to be photographed, said alignment automatically fixing the arc of a circle along which the camera moves, whereby exposures taken from two symmetrical positions on opposite sides of said line will provide a three-dimensional effect, and an object indicator movable along the frame interconnected for movement with said pivot point whereby aligning said indicator with said predetermined point will vertically align said pivot point with said predetermined point.

2. The apparatus of claim 1 wherein the object indicator is a light beam for focusing on the object to align the indicator with respect to the object.

3. Apparatus for taking stereoscopic pictures comprising a frame, carriage means slidably mounted along a line on said frame, a bar slidably movable and pivotably mounted about a point on said carriage means to enable pivoting thereof to positions on either side of said line, a camera mounted on one end of said bar, and a support for the object to be photographed movable along said line to bring the object into focus with the camera, said carriage means being movable to vertically align said pivot point with a point predetermined with respect to the object to be photographed, said alignment automatically fixing the arc of a circle along which the camera moves, whereby exposures taken from two symmetrical positions on opposite sides of said line will provide a three-dimensional effect, said carriage means comprising a pivot carriage, a plate mounted on said pivot carriage for rotation about said pivot point, and a pair of vertical members projecting from said plate and spaced to form a channel for slidably supporting said bar, one of the said vertical members projecting from said plate being movable against said bar with means to lock said one member against said bar and secure said bar against movement within the channel at any desired position, said locking means comprising a rotatable offset cam affixed to the plate adjacent the movable member, and a lever affixed to the cam to rotate said cam and force the offset portion of the cam against the movable member.

4. Apparatus for taking stereoscopic picture comprising a frame, carriage means slidably mounted along a line on said frame, a first bar slidably movable and pivotably mounted about a point on said carriage means to enable pivoting thereof to positions on either side of said line, a camera mounted on one end of said first bar, and a support for the object to be photographed movable along said line to bring the object into focus with said carriage means being movable to vertically align the pivot point with a point predetermined with respect to the object to be photographed, said alignment automatically fixing the arc of a circle along which the camera moves, whereby exposures taken from two symmetrical positions on opposite sides of said line will provide a three-dimensional effect, said carriage means comprising a pivot carriage, a plate mounted on said pivot carriage for rotation about said pivot point, a channel in which said first bar can slide formed by a spaced pair of vertical members projecting from said plate, one of said members being movable against said first bar to lock said first bar within said channel at any desired position, a rotatable offset cam affixed to said plate adjacent said movable member, a lever affixed to said cam to rotate said cam and force the offset portion of said cam against said movable member, a second bar slidable at an angle along said first bar and positioned to exert pressure against said lever, whereby movement of said second bar will rotate said cam and lock said first bar between said projecting members.

5. The apparatus of claim 4 wherein there is an alignment device comprising a pair of transverse spaced strips secured to the frame adjacent the camera mount and extending in a direction transverse to said line, a rotatable elliptical cam affixed to said first bar and disposed between said strips, said cam having a narrow dimension small enough to pass freely between the spaced strips and a large dimension greater than the distance between the spaced strips, whereby rotation of said cam will force the wide portion of said cam against the strips and align said first bar along said line.

6. Apparatus for taking stereoscopic pictures with a single frame, camera comprising a frame a carriage slidably mounted along a line on said frame a bar pivotally mounted about a point on said carriage to enable pivoting thereof to positions on either side of said line, a carriage slidably mounted along a line on said frame, a bar pivotably mounted about a point on said carriage to enable pivoting thereof to positions on either side of said line said pivot point being movable along said line to align the pivot vertically with a predetermined point behind the object to be photographed, said alignment automatically fixing the arc of a circle through which the camera moves, whereby exposures taken from two symmetrical positions on opposite sides of said line will provide a three-dimensional effect, and an object indicator movable along the frame interconnected with the movable pivot point whereby aligning said indicator with said predetermined point will vertically align said pivot point with said predetermined point behind the object.

* * * * *